United States Patent [19]
Bailey et al.

[11] Patent Number: 5,986,366
[45] Date of Patent: Nov. 16, 1999

[54] ROTOR FOR A DYNAMOELECTRIC MACHINE

[75] Inventors: Mark Wesley Bailey, Rockford; Leif William Cannell, Rockton, both of Ill.

[73] Assignee: Sundstrand Corporation, Rockford, Ill.

[21] Appl. No.: 09/159,803

[22] Filed: Sep. 23, 1998

[51] Int. Cl.$^6$ .................................................. H02K 9/00
[52] U.S. Cl. .............................. 310/52; 310/61; 310/211; 310/216; 417/353
[58] Field of Search ................................ 310/216, 52, 58, 310/54, 60 R, 65, 61, 60 A, 211, 261; 165/184; 417/353

[56] References Cited

U.S. PATENT DOCUMENTS

| | | | |
|---|---|---|---|
| 1,819,228 | 8/1931 | Coates | 310/211 |
| 1,996,460 | 4/1935 | Coates | 310/62 |
| 2,353,336 | 7/1944 | Heintz et al. | 310/61 |
| 2,630,464 | 3/1953 | Dunkelberger | 310/61 |
| 3,348,490 | 10/1967 | Katz et al. | 417/356 |
| 3,802,068 | 4/1974 | Scott | 29/598 |
| 3,939,907 | 2/1976 | Skvarenina | 165/86 |
| 4,365,178 | 12/1982 | Lenz | 310/61 |
| 4,395,816 | 8/1983 | Pangburn | 29/598 |
| 4,761,576 | 8/1988 | Savage | 310/51 |
| 5,693,995 | 12/1997 | Syverson | 310/114 |
| 5,859,483 | 1/1999 | Kliman et al. | 310/58 |
| 5,861,700 | 1/1999 | Kim | 310/261 |

Primary Examiner—Thomas M. Dougherty
Assistant Examiner—Joseph Waks
Attorney, Agent, or Firm—Wood, Phillips, VanSanten, Clark & Mortimer

[57] ABSTRACT

A rotor (10) is provided for a dynamoelectric machine. The rotor (10) includes a rotor shaft (12) and a laminated core (14). The rotor shaft (12) is adapted to mount the rotor (10) for rotation about an axis (13) of rotation in a dynamoelectric machine. The laminated core (14) includes a shaft receiving opening (42) extending along the axis (13). The opening (42) is defined by a plurality of helical lands (44) separated by a plurality of helical grooves (46), with both the lands (44) and the grooves (46) extending along the shaft (12). The lands (44) are engaged with a shaft (12) to mount the core (14) to the shaft (12) for rotation therewith about the axis (13). The grooves (46) are equally angularly spaced about the axis (13) and extend radially outward from the lands (44) and the shaft (12), whereby rotation of the shaft (12) pumps coolant through the grooves (46) to cool the rotor (10).

24 Claims, 3 Drawing Sheets

6,986,366

ROTOR FOR A DYNAMOELECTRIC MACHINE

FIELD OF THE INVENTION

This invention relates to rotors for dynamoelectric machines, and more specifically, to a rotor having improved efficiency for such machines.

BACKGROUND OF THE INVENTION

Dynamoelectric machines conventionally include stacks of laminations made up of magnetic material as part of the core of their rotor construction. In many cases, heat is generated in the lamination stack of the core as a result of eddy currents induced by magnetic fields generated during operation of the machine or as a result of hysterisis losses. Further, if the rotor is provided with an electrical winding or conductor bars, the lamination stack may be heated as a result of heat transfer from the electrical windings or conductor bars which heat up during the operation of the machine as a result of $I^2R$ losses. Over the years, many efforts have been made to prevent motor cores from overheating. For example, the use of stacks of laminations itself is employed to reduce eddy current losses which in turn reduces the heat generated in the rotor. Moreover, it is common to include a fan on the rotor shaft for drawing or propelling the coolant, typically ambient air, across machine components including the lamination stack. In this regard, it has also been conventional to provide coolant passages in the lamination stack and to flow a coolant that may range from ambient air to oil to a refrigerant through such passages for cooling purposes.

In a problem unrelated to cooling, the laminations must be mounted onto a rotor shaft after they are assembled to form a core. Grinding of the inside diameter of the assembled core and the outside diameter of the rotor shaft is often required to provide an acceptable interference fit between the inside diameter of the core and the outside diameter of the rotor shaft. One known approach to eliminate the requirement for grinding is to provide a dimpled or lobed inner periphery for the core. Because the lobes are more easily deformed than a continuous inside cylindrical surface, the core and the shaft can accommodate a broader range of manufacturing tolerances to provide an acceptable interference fit, thereby eliminating the requirement for grinding.

SUMMARY OF THE INVENTION

It is the principal object of the invention to provide a new and improved rotor for a dynamoelectric machine.

It is another object of the invention to provide a rotor core that acts to pump coolant through passages within the rotor when the rotor is rotated about its axis of rotation.

It is another object of the invention to provide such a rotor with a rotor shaft and a core that can be assembled together with an acceptable interference fit, without necessarily requiring expensive grinding operations on the shaft and the core.

According to one aspect of the invention, a rotor is provided for a dynamoelectric machine. The rotor includes a rotor shaft and a laminated core. The rotor shaft is adapted to mount the rotor for rotation about an axis of rotation in a dynamoelectric machine. The laminated core includes a shaft receiving opening extending along the axis of rotation. The opening is defined by a plurality of helical lands separated by a plurality of helical grooves with both the lands and the grooves extending along the shaft. The lands are engaged with the shaft to mount the core to the shaft for rotation therewith about the axis of rotation. The grooves are equally angularly spaced about the axis and extend radially outward from the lands and the shaft, whereby rotation of the shaft pumps coolant through the grooves to cool the rotor.

In accordance with one aspect of the invention, a rotor for a dynamoelectric machine is provided and includes a rotor shaft and a stack of planar laminations. The rotor shaft has an outer surface and is adapted to mount the rotor for rotation about an axis in a dynamoelectric machine. The stack of laminations are mounted on the rotor shaft with the planes of the laminations extending nominally perpendicular to the axis.

In one form, each of the laminations has a radially innermost periphery defining a plurality of equally angularly spaced windows between the lamination and the outer surface of the shaft. The windows are offset angularly about the axis from lamination to lamination to define a plurality of helical shape passages extending along the axis. Portions of the innermost peripheries of at least some of the laminations engage the shaft between the windows to mount the stack to the shaft for rotation therewith about the axis, whereby rotation of the shaft pumps coolant through the passages to cool the rotor.

In one form, each of the laminations has a radially innermost periphery defined by a plurality of radially inwardly extending lobes equally angularly spaced about the axis in the plane of the lamination by a plurality of recesses. At least some of the lobes on at least some of the laminations engage the outer surface of the rotor shaft to mount the stack to the rotor shaft for rotation therewith about the axis. The recesses are offset angularly about the axis from lamination to lamination to define a plurality of helical shaped passages extending along the axis, whereby rotation of the rotor about the axis pumps coolant through the passages to cool the rotor.

In accordance with one aspect of the invention, a method is provided for assembling a rotor for a dynamoelectric machine. The method includes the steps of providing a rotor shaft adapted to mount the rotor for rotation about an axis, providing a plurality of planar laminations, and assembling the laminations onto the rotor shaft. The rotor shaft has an outer surface. Each of the laminations has a radially innermost periphery defined by a plurality of radially inwardly extending lobes equally angularly spaced about an axis in the plane of the lamination by a plurality of recesses. The laminations are assembled onto the rotor shaft with a) an interference fit between at least some of the lobes and the outer surface of the shaft, and b) the recesses offset angularly about the axis from lamination to lamination to define a plurality of helical shaped passages extending along the axis.

Other objects and advantages will become apparent from the following specification taken in connection with the accompanying drawings.

DETAILED DESCRIPTION OF THE PREFERRED EMBODIMENT

Figure 1:
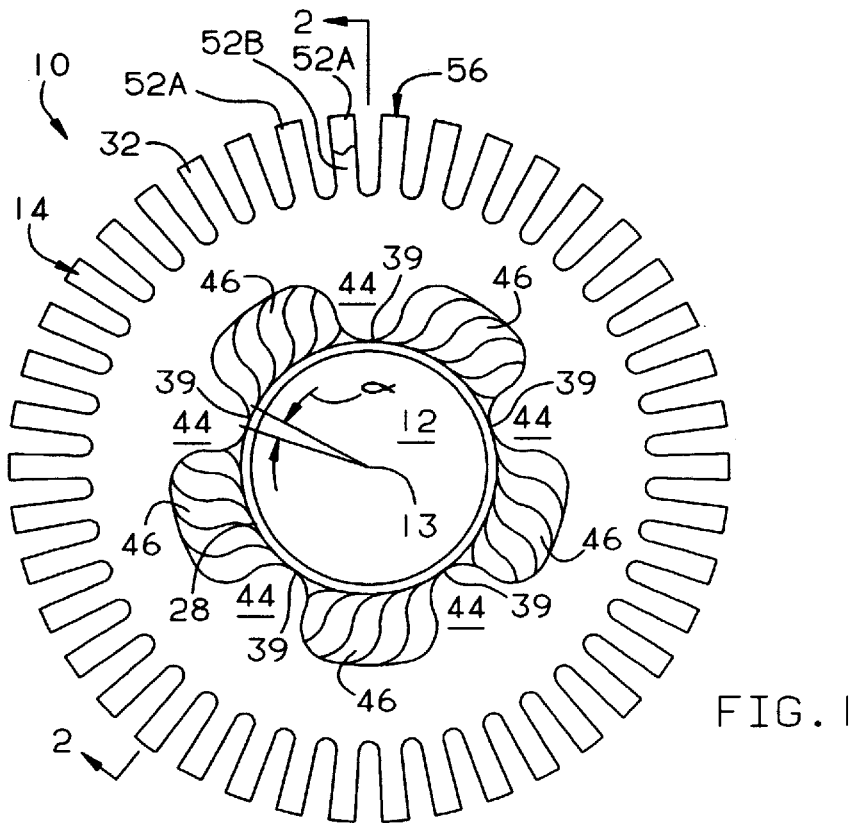
FIG. 1 is an end view of a laminated rotor for a dynamoelectric machine embodying the present invention.
Figure 2:
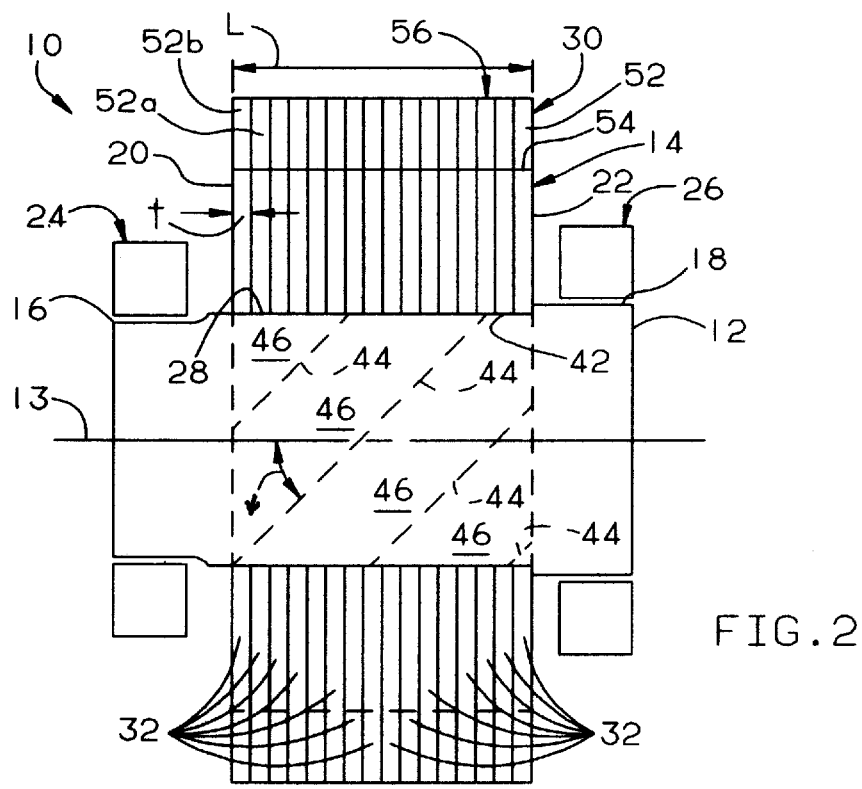
FIG. 2 is a section view taken generally along the line 2—2 in FIG. 1.

As seen in FIGS. 1 and 2, a rotor 10 is provided for a dynamoelectric machine, such as a generator or electric motor (not shown). The rotor 10 includes a rotor shaft 12 adapted to mount the rotor 10 for rotation about an axis 13 in a dynamoelectric machine, and a core 14 mounted on the shaft 12 for rotation therewith about the axis 13.

The rotational mounting of the rotor shaft in the dynamoelectric machine is not critical to the invention, and accordingly any suitable means, such as journal bearings, roller bearings, or magnetic bearings, may be employed. By way of example, in one embodiment shown in FIG. 2, the shaft 12 includes cylindrical end surfaces 16 and 18 extending from respective ends 20 and 22 of the core 14 to be received in suitable rotary bearings 24 and 26 respectively of the dynamoelectric machine. Additionally, the shaft 12 may be coupled by any suitable means, such as by a splined or keyed connection, to a power source or a load, depending upon whether the dynamoelectric machine is converting electric power into mechanical power, or mechanical power into electric power. The shaft 12 includes an outer surface 28 that mounts the core 14 and is preferably cylindrical throughout a length L of the core 14 between the ends 20 and 22.

Figure 3:
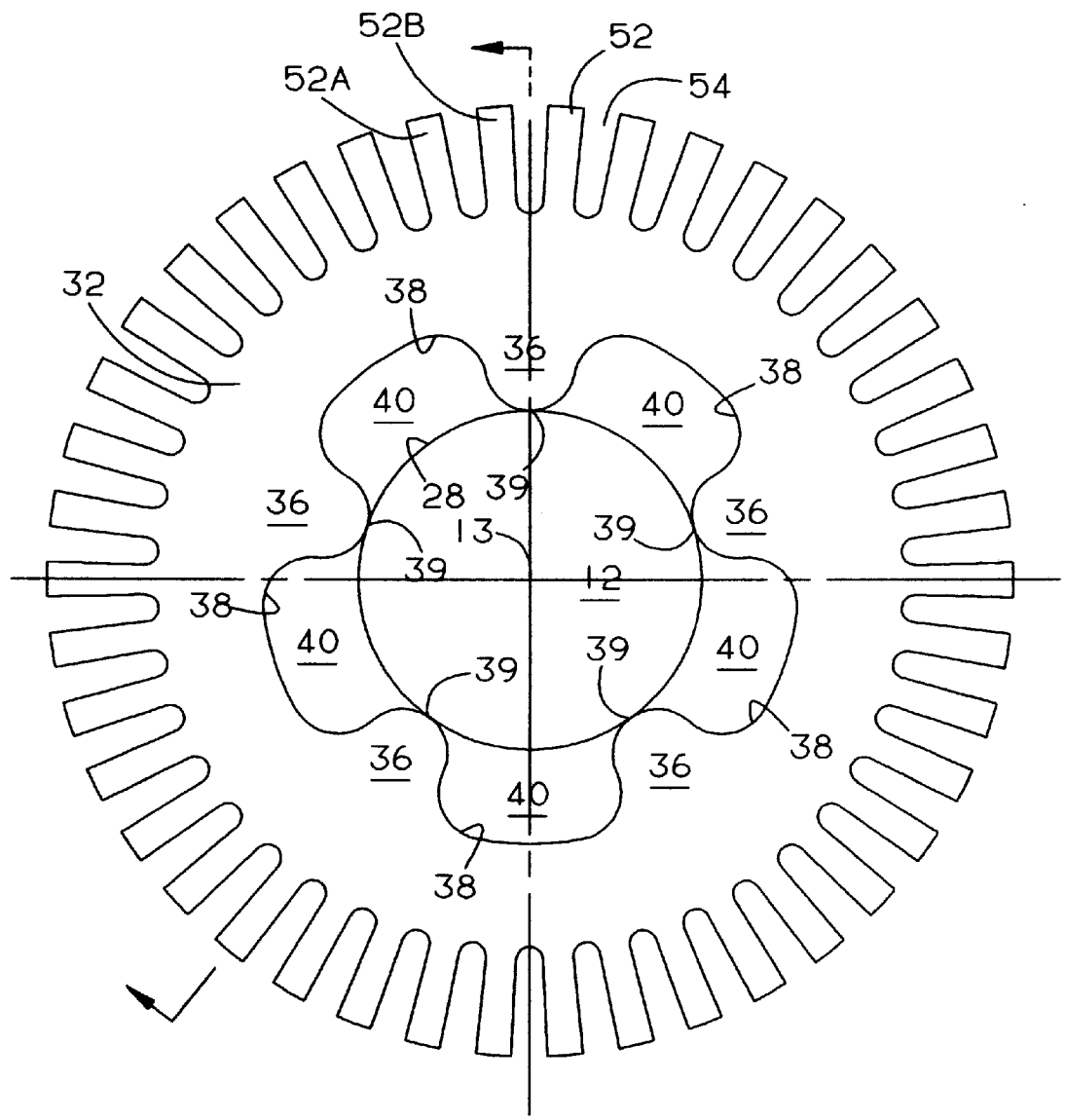
FIG. 3 is a view similar to FIG. 1 showing only one of the laminations of the rotor.

The core 14 includes a stack 30 of thin, planar laminations 32 made of a magnetic material and mounted on the shaft 12, with the planes of the laminations extending nominally perpendicular to the axis 13. Preferably, the laminations 32 have identical configurations so that they may be formed from a common machining pattern or die tool. As best seen in FIG. 3, each of the laminations 32 includes a radially innermost periphery 34 defined by a plurality of radially inwardly extending lobes 36 that are equally angularly spaced about the axis 13 in the plane of the lamination by a plurality of recesses 38. Preferably, each of the lobes 36 has a convex tip 39 for engagement with the outer surface 28 of the shaft 12. Together, the lobes 36 and the recesses 38 of each lamination 32 define a plurality of equally angularly spaced windows 40 between the lamination 32 and the outer surface 28 of the shaft 12.

When the laminations are assembled into the stack 30, the lobes 36, recesses 38, and windows 40 of each lamination 32 are offset angularly by an angular offset about the axis 13 from lamination 32 to lamination 32 in step-wise fashion to form a shaft receiving opening 42 defined by a plurality of helical lands 44, shown schematically by dashed lines in FIG. 2, separated by a plurality of helical grooves or passages 46, shown schematically between the dashed lines in FIG. 2. More specifically, the lobes 36 define the lands 44, with the angular offset of the lobes 36 from lamination 32 to lamination 32 creating the helical shape of the lands 44 along the axis 13. Similarly, the windows 40 define the grooves or passages 46, with the angular offset of the windows 40 from lamination to lamination creating the helical shape of the grooves or passages 46 along the axis 13. Accordingly, the opening 42, each of the lands 44, and each of the grooves 46 extend from one end 20 to the other end 22 of the core 14.

As best seen in FIG. 1, when the stack 30 is mounted on the shaft 12, the convex tips 39 of the lands 44 engage the outer surface 28 with an interference fit to mount the core 14 to the shaft 12 for rotation therewith about the axis 13. Thus, when the rotor 10 is rotated about the axis 13, the core 14 rotates with the shaft 12 and the helical grooves 46 act as impellers that pump coolant through the grooves 46 to cool the rotor 10.

As seen in FIGS. 1 and 2, in one embodiment, the angular offset from one lamination 32 to the next lamination 32 is uniform throughout the length L of the stack 30. This provides the grooves 46 with a helical shape having a constant helix angle $\Psi$ from one end 20 to the other end 22 of the core 14. It should be appreciated that the helix angle $\Psi$ is dependent upon the angular offset $\alpha$ and the thickness t of each of the laminations 32.

As best seen in FIG. 3, preferably each of the laminations 32 includes a plurality of teeth 52 equally spaced circumferentially about the axis 13 by a plurality of slots 54 adapted to receive windings, or conductor bars, depending upon the desired configuration for the rotor 10. As seen in FIGS. 1 and 2, in one embodiment, the teeth 52 are angularly aligned from lamination 32 to lamination 32 to form aligned stacks 56 of the teeth 54 extending parallel to the axis 13, rather than being angularly offset to form helical stacks 56 of the teeth 54. To create the angular offset $\alpha$ from lamination 32 to lamination 32, each lamination in the stack 30 is clocked relative to the immediately preceding lamination 32 by a tooth increment I. More specifically, with reference to the embodiment in FIG. 1, each of the laminations 32 has a tooth 52A and a tooth 52B located at specific angular positions on the lamination 32. For the embodiment in FIG. 1, the tooth increment I=1, and the tooth 52A on the lamination 32 adjacent the front lamination 32 is aligned with the tooth 52B on the front lamination 32. Even more specifically, and by way of further example, in FIG. 1, each lamination 32 has 42 of the teeth 52 and 5 of the lobes 36. If the tooth increment I=1, as shown in FIG. 1, the angular offset $\alpha$ will equal 8.57°. If the tooth increment I=8 from lamination 32 to lamination 32, $\alpha$ will equal 3.43°. If the tooth increment I=17 from lamination 32 to lamination 32, the angular offset $\alpha$ will equal 1.7143°. Thus, for cores 14 having identical laminations, and tooth stacks 56 that extend parallel to the axis 13, it can be seen that the angular offset $\alpha$ is dependent upon number of teeth 52, the number of lobes 36, and the tooth increment I. In this regard, it is preferred that the number of lobes 36 and the number of teeth 54 not be mathematical factors of each other. This maximizes the number of possible angular offsets $\alpha$ that can be created with a particular set of identical laminations 32.

Figure 4:
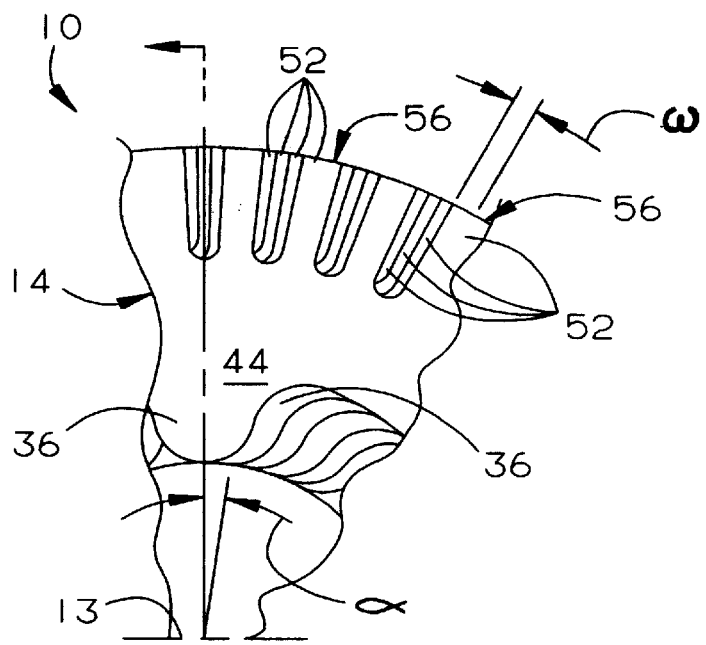
FIG. 4 is a fragmentary end view similar to FIG. 1 but showing another embodiment of a laminated rotor embodying the present invention.

As seen in FIG. 4, in one embodiment of the rotor 10, the teeth 52 are provided with an angular offset $\omega$ to form helical stacks 56 of the teeth 52, rather than stacks 56 that extend parallel to the axis 13. In the embodiment of FIG. 3, the angular offset of the teeth 54 is counterclockwise, while the tooth increment I has been done in a clockwise fashion to create a clockwise angular offset $\alpha$ for the lobes 36. The angular offset $\omega$ of the teeth 52 is dictated by the electromechanical requirements of the dynamoelectric machine for which the rotor 10 is intended, while the angular offset $\alpha$ of the lobes 36 is dictated by the type of coolant and the amount of pumping required for adequate cooling of the rotor 10. Because a number of angular offsets $\alpha$ can be provided by selecting different tooth increments I independent of the angular offset $\omega$, the angular offset $\omega$ and the angular offset $\alpha$ can both be optimized to satisfy each of their particular requirements. It should be understood that the angular offset $\omega$ of the teeth 52 will increase or decrease the angular offset $\alpha$ that would have been created by a particular tooth increment I if not for the angular offset $\omega$ of the teeth 54. For example, as discussed above in connection with FIG. 1, if the tooth increment I=1 in the clockwise direction, and there is no angular offset ω of the teeth 54, the angular offset α will equal 8.57°. But, if the angular offset ω is 0.57° in the counterclockwise direction, then the angular offset α will equal 8°. On the other hand, if the angular offset ω equals 0.57° in the clockwise direction, then the angular offset α will equal 9.14°. Thus, it can be seen that the angular offset ω of the teeth 54 can add or subtract to the angular offset a that is created purely as a result of the tooth increment I.

Figure 5:
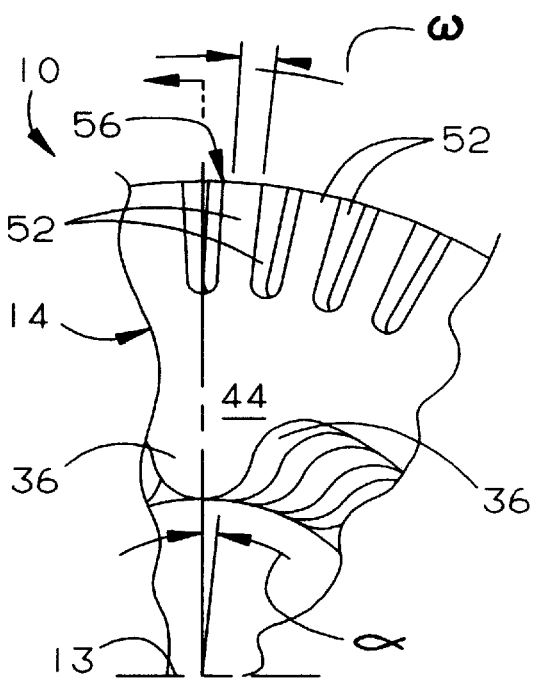
FIG. 5 is a fragmentary end view similar to FIG. 3 but showing yet another embodiment of a laminated rotor embodying the present invention.

FIG. 5 shows one embodiment of the rotor 10 where the tooth increment I=0, and the angular offset α equals the angular offset ω because both of the angular offsets α and ω have been created by simply skewing the laminations 32 in the clockwise direction from lamination to lamination, without incrementing the teeth 54 from lamination 32 to lamination 32. Accordingly, for this embodiment of the rotor 10, angular offsets α and ω cannot be optimized independently.

While FIGS. 1-2 and 4-5 illustrate embodiments having a uniform angular offset α throughout the length L of the core 14 to provide the grooves 46 with a constant helix angle Ψ, it should be understood that a core 14 can be formed from multiple stacks 30 of the laminations 32, with the angular offset α being uniform within each stack 30, but varying from stack 30 to stack 30 to provide the grooves 46 with a helical shape having a helix angle Ψ that varies from one end 20 to the other end 22 of the core 14. For example, a core 14 could be formed from first, second, and third stacks 30, with each of the stacks 30 having four laminations 32, and with the first stack having a tooth increment I=17 and an angular offset α equal to 1.7143°, the second stack 30 having a tooth increment I=8 and an angular offset equal to 3.43°, and the third stack having a tooth increment I=1 and an angular offset α equal to 8.57°. It should also be understood that in the case of a core 14 formed from multiple stacks 30, the laminations 32 of one of the stacks 30 may have no angular offset so that the portions of the grooves 46 defined by the one stack 30 extend parallel to the axis 13, rather than at a helix angle Ψ. It should further be understood that the angular offset α may vary from lamination 32 to lamination 32 to lamination 32 within a single stack 30. For example, a stack 30 could be formed from first, second, and third laminations 32, with the tooth increment I=17 between the first lamination 32 and the second lamination 32, and a tooth increment I=8 between the second lamination 32 and the third lamination 32.

It should also be understood that, while it is preferred that the laminations 32 forming the core 14 be identical so that each lamination can be formed from the same machine pattern or die tool, a core 14 having helical lands 44 and grooves 46 can be formed from laminations 32 that are not identical. Further, it should be understood that the specific size, shape, and number of each of the lobes 36, recesses 38, teeth 52 and slots 54 shown in FIG. 1 are for purposes of illustration only, and that the invention contemplates other numbers and shapes for these features that may be suitable for the requirements of the specific dynamoelectric machine for which the rotor 10 is intended.

Preferably, the laminations 32 are stacked with the desired angular offset(s) between the laminations 32 to form the core 14. After the core 14 is assembled, windings or conductor bars may be assembled into the slots 54 between the teeth 52. The core 14 is then assembled onto the shaft 12 with a suitable interference fit between the surface 28 and the lands 44. As an alternate method of assembly, the laminations 32 could be stacked individually on the shaft 12 to form the core 14.

It should be appreciated that by providing each of the laminations 32 with the lobed inner periphery 34, the shaft 12 and the core 14 can be assembled with an acceptable interference fit, without necessarily requiring expensive grinding operations. Further, by providing an angular offset from lamination 32 to lamination 32 in the core 14, rotation of the rotor 10 about the axis 13 pumps coolant through the passages 46 which act as impellers within the rotor 10.

It should also be appreciated that by providing the passages 46 at the innermost periphery of the core 14, disruption of the desired magnetic flux paths through the core 14 is minimized. Accordingly, enhanced cooling is achieved without the loss of magnetic efficiencies associated with disruptions of the magnetic flux paths through the core.

We claim:

1. A rotor for a dynamoelectric machine, the rotor comprising:

a rotor shaft adapted to mount the rotor for rotation about an axis of the rotor, the shaft having an outer surface; and a first stack of planar laminations mounted on the rotor shaft with planes of the laminations extending nominally perpendicular to the axis, each of the laminations having a radially innermost periphery defining a plurality of equally angularly spaced windows between the lamination and the outer surface of the shaft, the windows being offset angularly about the axis from one to another of the laminations to define a plurality of helical shaped passages extending along the axis, portions of the innermost peripheries of at least some of the laminations engaging the shaft between the windows to mount the stack to the rotor shaft for rotation therewith about the axis, whereby rotation of the shaft pumps coolant through the passages to cool the rotor.

2. The rotor of claim 1 wherein the angular offset of the windows one to another of the laminations is a uniform angular offset α throughout the first stack.

3. The rotor of claim 2 wherein each of the laminations includes a plurality of teeth spaced circumferentially about the axis by a plurality of slots, each of the laminations having an equal number N of the teeth.

4. The rotor of claim 3 wherein the teeth on the laminations are circumferentially aligned to form the number N of aligned stacks of the teeth, each of the N stacks extending parallel to the axis.

5. The rotor of claim 3 wherein the teeth on the laminations are angularly offset to form the number N of helical shaped stacks of the teeth extending along the axis.

6. The rotor of claim 5 wherein the angular offset of the teeth from lamination to lamination is not equal to the angular offset of the windows from lamination to lamination.

7. The rotor of claim 1 wherein the laminations all have an identical shape.

8. The rotor of claim 1 further comprising a second stack of planar laminations mounted on the rotor shaft, the first and second stacks of laminations forming a rotor core with a plurality of passages extending along the axis through the core, with at least a portion of each of the passages having a helical shape whereby rotation of the rotor shaft pumps coolant through the passages to cool the rotor.

9. A rotor for a dynamoelectric machine, the rotor comprising:

a rotor shaft adapted to mount the rotor for rotation about an axis of the rotor, the shaft having an outer surface; and a stack of planar laminations mounted on the rotor shaft with planes of the laminations extending nominally perpendicular to the axis, each of the laminations having a radially innermost periphery defined by a plurality of radially inwardly extending lobes equally angularly spaced about the axis in the plane of the lamination by a plurality of recesses, at least some of the lobes on at least some of the laminations engaging the outer surface of the rotor shaft to mount the stack to the rotor shaft for rotation therewith about the axis, the recesses being offset angularly about the axis from one to another of the laminations to define a plurality of helical shaped passages extending along the axis, whereby rotation of the rotor about the axis pumps coolant through the passages to cool the rotor.

10. The rotor of claim 9 wherein:

the outer surface of the shaft is cylindrical; and each of the lobes has a convex shaped tip that provides a line contact upon engagement with the outer surface.

11. The rotor of claim 9 wherein each of the laminations have an equal number of lobes L.

12. The rotor of claim 11 wherein each of the laminations includes a plurality of teeth spaced circumferentially by a plurality of slots, each of the laminations having an equal number N of the teeth.

13. The rotor of claim 12 wherein the number N and the number L are not factors of each other.

14. The rotor of claim 12 wherein the laminations all have an identical shape.

15. The rotor of claim 12 wherein the teeth on the laminations are circumferentially aligned to form the number N of aligned stacks of the teeth, each of the N stacks extending parallel to the axis.

16. The rotor of claim 12 wherein the teeth on the laminations are angularly offset to form the number N of helical shaped stacks of the teeth extending along the axis.

17. The rotor of claim 16 wherein the angular offset of the teeth from lamination to lamination is not equal to the angular offset of the recesses from lamination to lamination.

18. A rotor for a dynamoelectric machine, the rotor comprising:

a rotor shaft adapted to mount the rotor for rotation about an axis of rotation of the rotor; and a laminated core including a shaft receiving opening extending along the axis of rotation between first and second ends of the core, the opening defined by a plurality of helical lands separated by a plurality of helical grooves, the lands and grooves extending from the first end to the second end, the lands engaged with the shaft to mount the core to the shaft for rotation therewith about the axis, the grooves being equally angularly spaced about the axis and extending radially outward from the lands and the shaft, whereby rotation of the shaft pumps coolant through the grooves to cool the rotor.

19. The rotor of claim 18 wherein:

the shaft has a cylindrical outer surface; and each of the lands has a convex shape that provides a line contact upon engagement with the outer surface.

20. The rotor of claim 18 wherein the helical shape of each of the grooves has a constant helix angle from the first end of the core to the second end of the core.

21. The rotor of claim 18 wherein the core further includes a plurality of teeth separated by a plurality of slots extending parallel to the axis.

22. The rotor of claim 18 wherein the core is formed from a plurality of identically shaped laminations.

23. A method of assembling a rotor for a dynamoelectric machine, the method comprising the steps of:

providing a rotor shaft adapted to mount the rotor for rotation about an axis, the rotor shaft having an outer surface;

providing a plurality of planar laminations, each of the laminations having a radially innermost periphery defined by a plurality of radially inwardly extending lobes equally angularly spaced about an axis in the plane of the lamination by a plurality of recesses; and assembling the laminations onto the rotor shaft with a) an interference fit between at least some of the lobes and the outer surface of the shaft, and b) the recesses offset angularly about the axis from lamination to lamination to define a plurality of helical shaped passages extending along the axis.

24. The method of claim 23 further comprising the step of stacking the laminations to form a core prior to the assembling step.

* * * * *